United States Patent [19]

Weichel

[11] Patent Number: 4,534,432
[45] Date of Patent: Aug. 13, 1985

[54] MOTOR DRIVE UNIT FOR FORMING SELF-DRIVING AGRICULTURAL IMPLEMENTS OF VARIOUS STRUCTURES

[76] Inventor: Ernst Weichel, Postfach 1180, 7326 Heiningen, Fed. Rep. of Germany

[21] Appl. No.: 332,209

[22] Filed: Dec. 18, 1981

[30] Foreign Application Priority Data

Dec. 24, 1980 [DE] Fed. Rep. of Germany ....... 3049055

[51] Int. Cl.³ ............................................. B62D 49/06
[52] U.S. Cl. .................................... 180/1 T; 180/900
[58] Field of Search ................. 180/11, 252, 253, 900, 180/DIG. 1

[56] References Cited

U.S. PATENT DOCUMENTS 3,198,276 8/1965 Gordon ................................. 180/11

FOREIGN PATENT DOCUMENTS 485429 11/1975 Australia ............................... 180/11
420654 10/1925 Fed. Rep. of Germany .
872874 4/1953 Fed. Rep. of Germany .
973430 2/1960 Fed. Rep. of Germany ........ 180/11
55-1272 8/1980 Japan ................................... 180/252
736858 9/1955 United Kingdom ................ 180/252

Primary Examiner—John A. Pekar
Assistant Examiner—D. Lynn Fugate
Attorney, Agent, or Firm—Toren, McGeady and Stanger

[57] ABSTRACT

It is intended to form differently structured agricultural vehicles or processing units by combining a uniaxial, controllable motor basic unit (G) with corresponding implements or machine groups (M). For this purpose the motor basic unit (G) has couplings (K) of the same size which are disposed mirror-image like to its driving shaft (A) and the implements to be attached or implement parts (M) have corresponding coupling countermembers (K'). The coupling members (K and K') are designed as so-called high-speed couplings and self-coupling high-speed connections for the required electric and/or hydraulic connecting lines can be disposed within these couplings.

7 Claims, 9 Drawing Figures

MOTOR DRIVE UNIT FOR FORMING SELF-DRIVING AGRICULTURAL IMPLEMENTS OF VARIOUS STRUCTURES

The present invention relates to a motor drive unit according to the introductory part of the main claim and to implements formed therewith.

The stock of machinery and implements of well mechanized agricultural operations constitutes—as seen as a total in the present time—a more or less accidentally formed mixture of the most varied tractors and processing units. In nearly all the operations this results in disadvantages of an economic, labour-economic as well as production-technological kind.

These disadvantages lie substantially in poor utilization of expensive individual machines, time-consuming attaching and detaching work of the most varied implements and in the use of non-optimal machines for maintaining and improving the soil structure.

The high state of mechanization heretofore had the certainly undesired side effect that the more modern the farmer's machinery the more money he will have to spend for fertilizers ad pesticides and he thus has ever decreasing amounts of money available for paying for better machinery.

Therefore, it should be the aim of any future agricultural development to ensure that new agricultural machinery either increases the yields of the agricultural useful areas by improved operating qualities or so reduce the expenditure for agricultural chemicals that even average agricultural operations will be in a position to employ the labour-economically, production-technologically, politico-economically and ecologically *optimal* machines and to finance them from their improved yields.

Therefore, with respect to the required stock of machinery these considerations necessarily result in modular attachable and convertible multipurpose units according to the introductory part of the main claim and as they are already fundamentally known, for example, from the old Geman Pat. Nos. 420654 and 872874. However, in function and construction the mechanical systems shown in these patents are completely unsuitable for today's requirements of modern agriculture since they permit only a very slight range of variation in the structure of different implement units.

This is where the present invention starts with the aim of creating a novel system of a correspondingly modular mechanical basic equipment, which permits the fastest and most varied assembly of any self-driving implement and implement combination required in modern agricultural technology from the simplest transport truck to the harvester thresher or the most expensive soil-processing implement.

This aim is achieved by the constructional and implement-technological measures defined in the patent claims, said measures being indicated in the drawings, for example, as substantially diagrammatic representations. The individual measures are described in greater detail with reference to these drawings.

The FIGS. 5 to 9 show, also in lateral view, various implement combinations in association with the basic unit (G).

Figure 1:
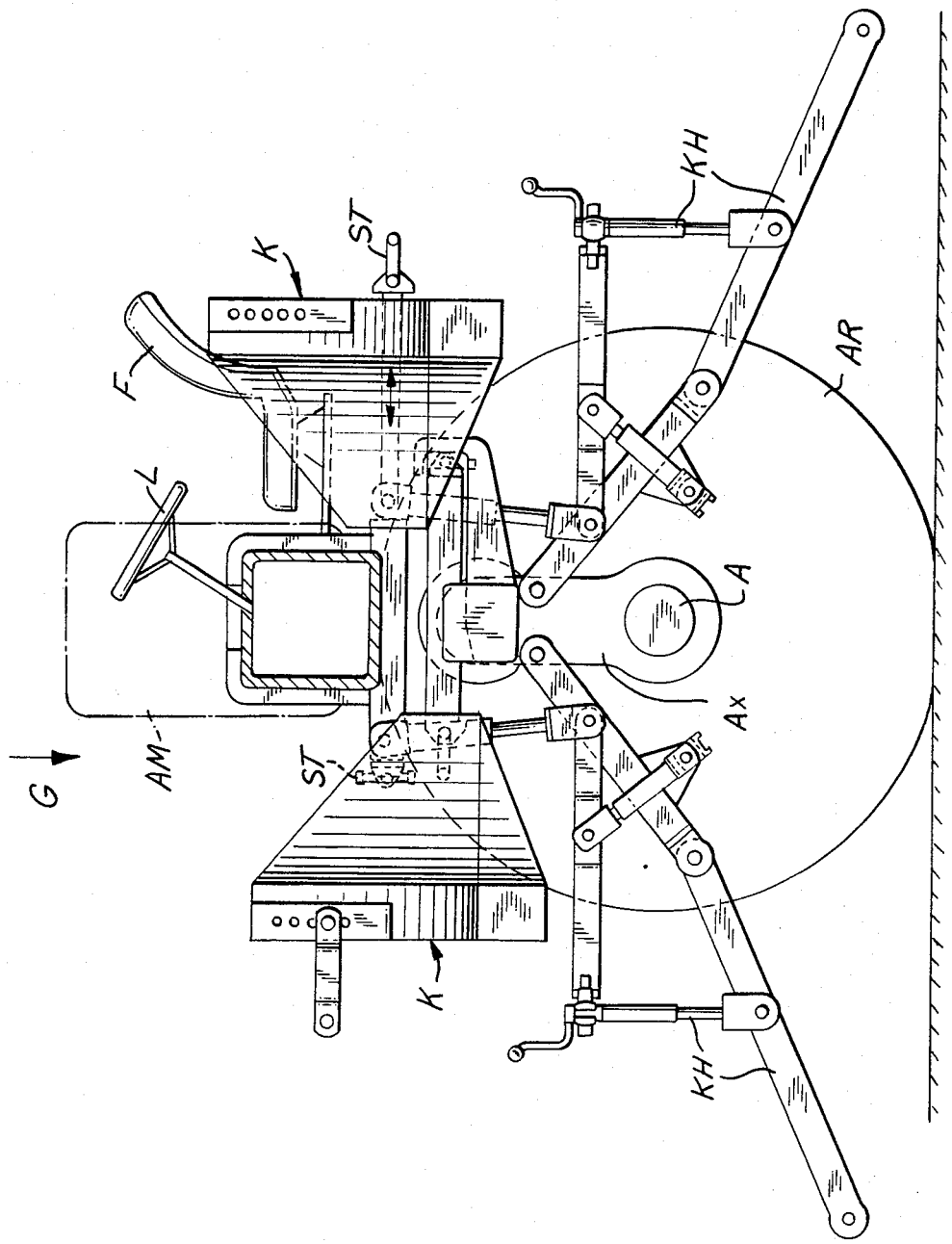
FIG. 1 shows a lateral view of the basic unit (G) according to the present invention.
Figure 2:
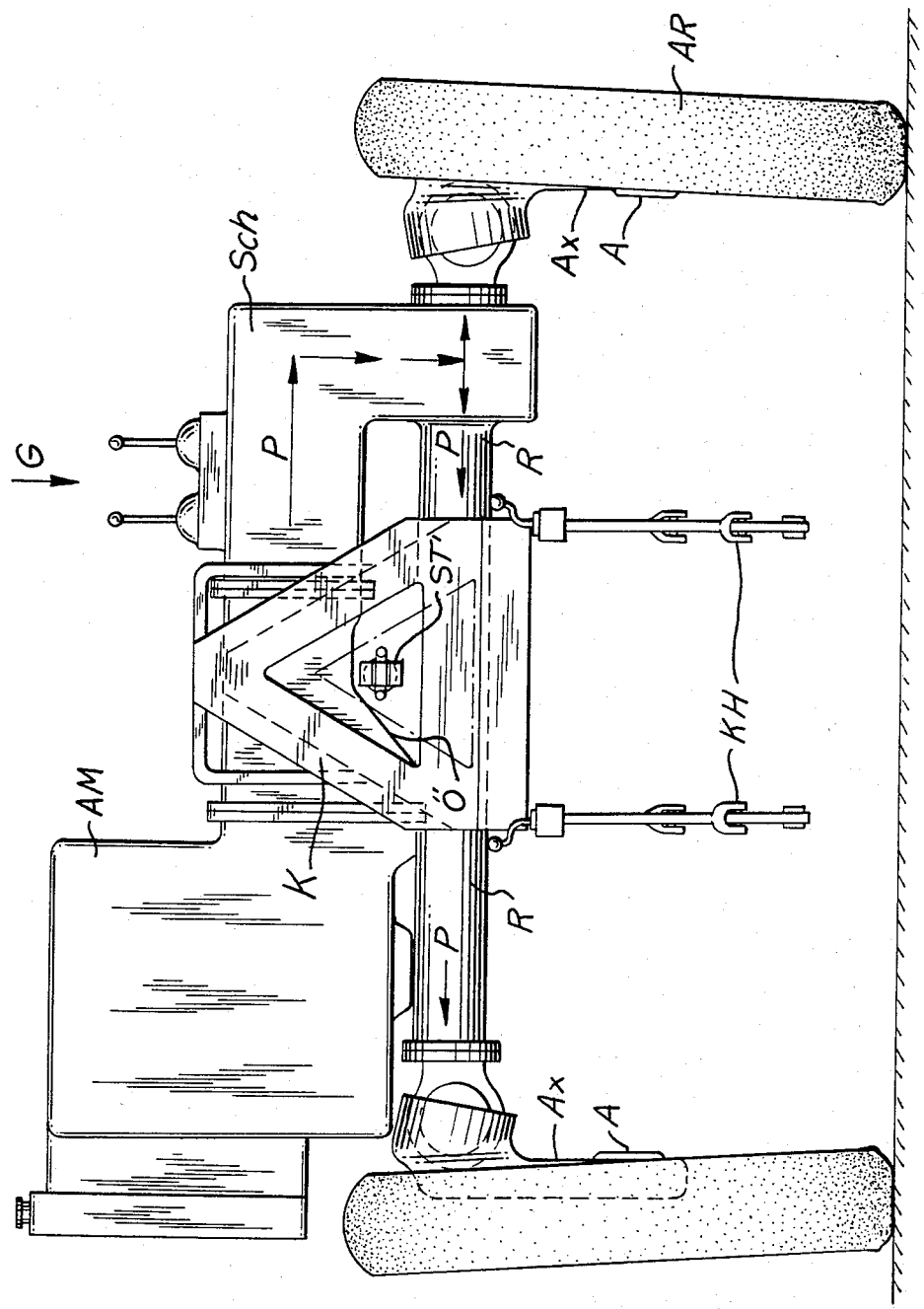
FIG. 2 shows a view of FIG. 1 in the direction of travel.
Figure 3:
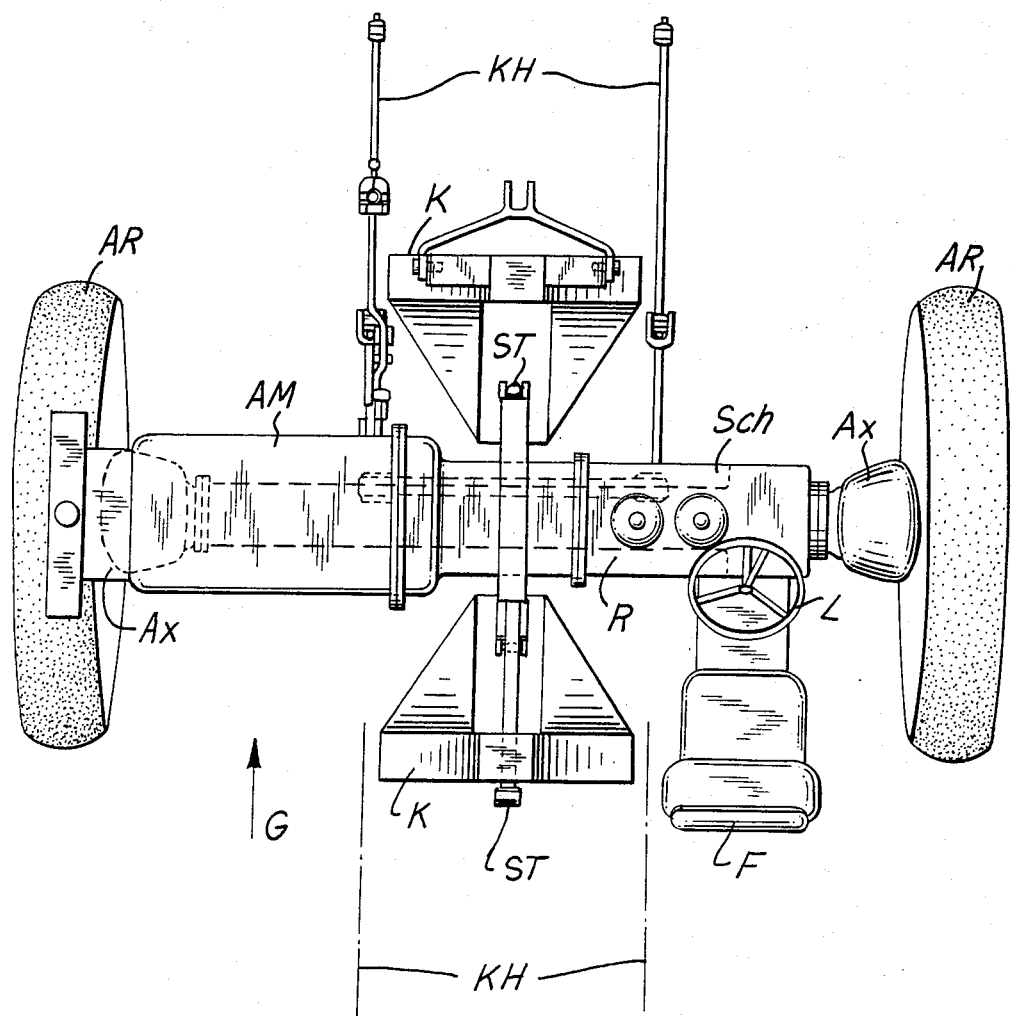
FIG. 3 shows a top view for FIG. 1.

The controllable, uniaxial, motor basic unit shown as a single member in the FIGS. 1 to 3 has, as structural elements, two coupling members K, K, disposed mirror-image like to the driving shaft A, and lift rods KH associated with said members. These lift rods, which are similar to those known from tractors, also are disposed mirror-image like to the driving shaft A and are secured to the frame R in a manner not shown. They are variable and adjustable in their position in a conventional manner.

According to the present invention the coupling members K are designed as high-speed couplings, i.e., gripper bars ST actuated via hydraulic cylinders, or the like, can be mechanically, automatically extended by the driver and loop traction eyes Z, or the like, corresponding to said gripper bars can be engaged. Said loop traction eyes Z are attached to corresponding coupling members K' of the auxiliary shaft and the latter's frame R'. As indicated in FIG. 2 the opening Ö of the coupling members K should be so designed that on bringing in the coupling countermembers K' the coupling members K automatically center said countermembers. Semidetached intermediate positions for a desired vertical adjustment of individual auxiliary devices are possible in this kind of coupling procedure in the phases of coupling and uncoupling. The high-speed coupling system according to the present invention has the additional advantage that the connecting elements for hydraulic and electric leads can be included in the corresponding coupling members K and K' and thus do not have to be coupled individually by hand as heretofore.

It also is clearly evident from FIG. 2 that the design of the frame R with the axle journals Ax of the motor basic unit G is portal-like so that a large ground clearance results and that it is thus possible (as is evident, e.g., from FIG. 7) to assemble implement combinations which extend between the drive wheels AR and are supported by the front and/or rear lift rods KH. The motor basic unit G is completed by the driving motor AM, the change-over gear Sch with flux of force according to the arrow P, and the driver's seat F with steering wheel L.

Figure 5:
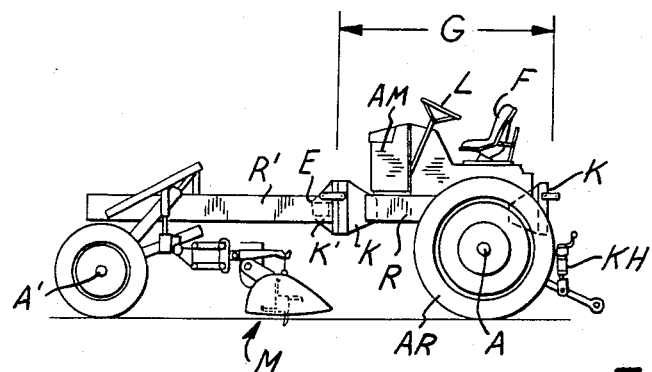
Figure 6:
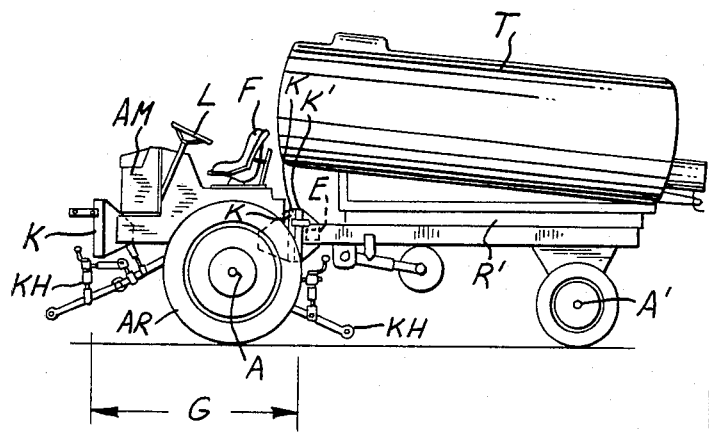
Figure 7:
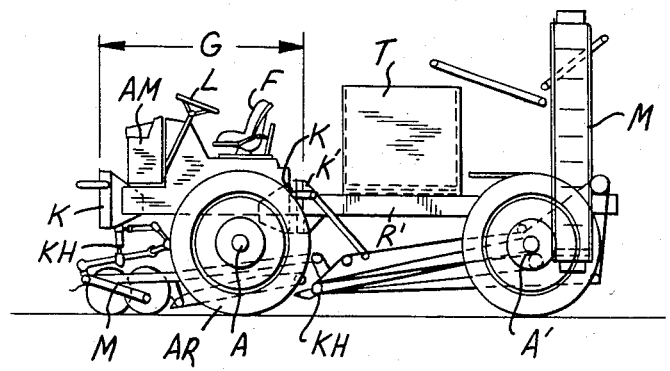
Figure 8:
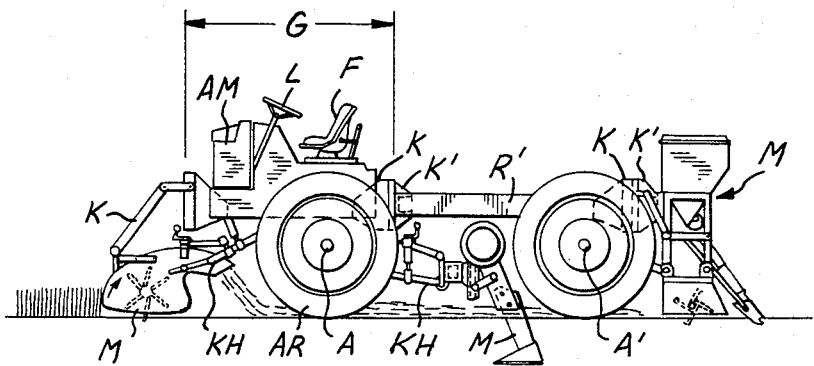
Figure 9:
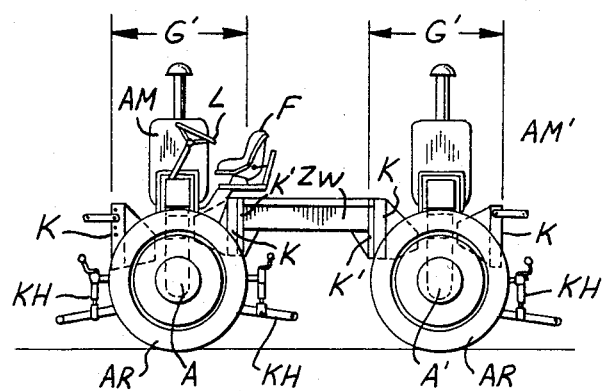

With the motor basic unit having the structural principle described above nearly all the conveying implements T and operating machines M for agriculture—for which a tractor or a special self-contained drive was required heretofore—can now be combined in a modular manner. As corresponding examples FIG. 5 shows a cultivator or tiller, FIG. 6 shows a tank for liquids and FIG. 8 shows a soil tilling machine and a drill. In this latter design a further high-speed coupling K, K' is disposed at the second shaft A', or turnip-or potato harvester according to FIG. 7 may be used for attaching. Furthermore, by means of an intermediate bridge ZW having corresponding coupling members it is also possible, within the scope of the present invention, to combine two of the motor basic units G and G' as an all-wheel driven vehicle. This kind of variant is shown in FIG. 9.

Figure 4:
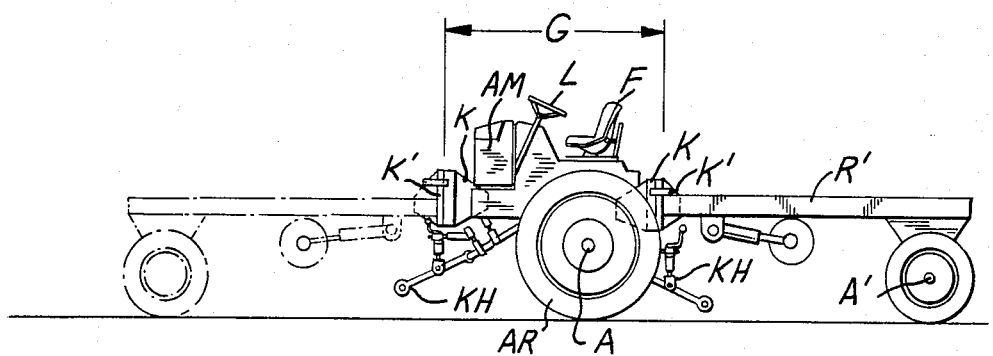
FIG. 4 shows the basic implement according to the present invention with auxiliary shaft in lateral view.

However, it is a prerequisite for all these attaching and converting operations that in the starting stage the so-called separately detachable auxiliary shaft according to FIG. 4 is used in such a way that in consecutive individual process steps at least one of the various conveying and operating implements is driven to the parking area by means of an auxiliary shaft coupled to the front or rear of the driven basic unit, that such an implement is coupled to the controllable basic unit either additionally to the auxiliary shaft or instead of it, whereupon the auxiliary shaft is detached and removed and that when exchanging the individual operating implements or group or implements or machines at least one supporting second shaft having at least one wheel is coupled to the motor basic unit in each stage of the process.

I claim:

1. A motor driven unit for forming differently structured, at least biaxial, self-driving agricultural transport implements and operating machines comprising a uniaxial and controllable motor basic unit having a front end and a rear end and a driving shaft extending transversely of the front end-rear end direction, and at least one special element attachable to one of the front and rear ends of said basic unit and having at least one further shaft, characterized in that the controllable motor basic unit (G) has similar couplings disposed mirror-image like on opposite sides of said driving shaft (A) and that said at least one special element having said at least one further shaft has a free terminal end (D) provided with a matching coupling countermember (K') engageable with one of said couplings, said controllable motor basic unit including a frame, a driving motor, a driver's seat and a steering wheel for said driving shaft.

2. A device according to claim 1, characterized in that the couplings and coupling countermember (K, K') are constructed as automatically centering high-speed clutches.

3. A device according to claim 1, characterized in that each of the couplings (K) has gripper bars (ST) which can be moved independently of each other.

4. A device according to one of claims 1, 2 or 3, characterized in that the high-speed coupling members and coupling countermember (K and K') also contain connections and junctions for electric power supply as automatically coupling plug connections.

5. A device according to claim 1, characterized in that lift rods (KH), which also are disposed mirror-image like, and are attached to the frame (R) of the motor basic unit (G) in addition to the couplings (K).

6. A device according to the claim 1, characterized in that said driving shaft includes wheel axle journals, the frame (R) of the basic unit (G) is constructed like a portal and that it is supported on the wheel axles (A) via the axle journals (Ax) and extends above said wheel axles.

7. A device according to claim 6, characterized in that a change-over gear (Sch) is connected to said driving motor above the frame (F) and is connected through said frame (F) (arrows P) to the axle journals (Ax) and to the drive wheels (Ar).

* * * * *